United States Patent [19]
Kaneshige

[11] Patent Number: 6,047,726
[45] Date of Patent: Apr. 11, 2000

[54] AUSTENITIC STAINLESS STEEL VALVE

[75] Inventor: Noritsugu Kaneshige, Nara, Japan

[73] Assignee: Aska Corporation, Yamatokohriyama, Japan

[21] Appl. No.: 09/108,222

[22] Filed: Jul. 1, 1998

[30] Foreign Application Priority Data

Nov. 7, 1997 [JP] Japan ..................................... 9-305874

[51] Int. Cl.⁷ .................................................. F16K 17/38
[52] U.S. Cl. ......................... 137/468; 137/375; 251/266; 251/368
[58] Field of Search ..................................... 251/368, 194, 251/266, 291, 344; 137/375, 468, 334, 340

[56] References Cited

U.S. PATENT DOCUMENTS

| | | | |
|---|---|---|---|
| 1,442,204 | 1/1923 | Wilson | 137/468 |
| 2,555,262 | 5/1951 | Weinberg | 137/468 |
| 4,269,391 | 5/1981 | Saito et al. | 251/315 |
| 4,529,169 | 7/1985 | Johns et al. | 251/356 |
| 4,696,324 | 9/1987 | Petronko | 137/375 |
| 5,454,547 | 10/1995 | Brown | 251/214 |

*Primary Examiner*—A. Michael Chambers
*Attorney, Agent, or Firm*—Wenderoth, Lind & Ponack, L.L.P.

[57] ABSTRACT

An austenitic stainless steel valve which is used at 100° C. or higher is easy to operate at the beginning of use. The valve of the present invention has a valve body made from an austenitic stainless steel, and a stem adapted to be reciprocated to open and close the valve. The stem is made from a metal having a thermal expansion coefficient that is ten-thirteenths or less of that of an austenitic stainless steel. Such a metal may be a ferritic or martensitic stainless steel. With this arrangement, it is possible to restrict the compressive stress applied to the stem within an allowable stress for the material of the stem and thus to prevent the destruction of the seat or the bending of the stem. The valve can thus be used easily.

9 Claims, 6 Drawing Sheets

AUSTENITIC STAINLESS STEEL VALVE

BACKGROUND OF THE INVENTION

This invention relates to an austenitic stainless steel valve used at high temperatures (e.g., in the chemical industry) and which is easy to operate at the start of its use.

FIGS. 1 and 2 show Y-type globe valves, which are typical austenitic stainless steel valves used at high temperatures, typically; at 100° C. or higher. These valves each have a valve body 1 having a passage 2 formed therethrough and provided with a seat 3. A stem 4 is axially movably mounted on the valve body 1. A gland plate 7 and a gland bolt 8 compress and retain a gland packing 6 sandwiched between the stem 4 and a cover flange 5. A yoke 9 is fixed to the valve body 1 so as to extend parallel to the stem 4. A yoke flange 10 is mounted around one end of the stem 4 and fixed to the yoke 9. Rotatably inserted in the yoke flange 10 is a sleeve 11 formed with female threads which in mesh with male threads 13 formed on the stem 4. A handle 14 is fixed to the sleeve 11 to turn it. A rotation stopper 15 fixed to the stem 4 prevents rotation of the stem 4 by abutting the yoke 9. The stem 4 is moved by engagement with the sleeve 11.

The valve of FIG. 1 has a separate disk 16 mounted to the tip of the stem 4. The valve of FIG. 2 has a disk 16 integrally formed at the tip of the stem 4. When the sleeve 11 is turned by turning the handle 14, the stem 4 is moved axially because it cannot rotate. When the stem 4 is advanced, the disk 16 at the tip of the stem is pressed against the seat 3, stopping the fluid flow through the passage 2.

Thus, in this type of valve, while the valve is closed with the stem 4 compressed between the seat 3 and the sleeve 11 of the yoke flange 10, a compressive stress acts on the valve parts.

The female threads 12 of the sleeve 11 and the male threads of the stem 4 have a smaller lead than the friction angle so that the stem 4 will not loosen under reaction force from the seat 3,(i.e., move while the valve is closed).

The valves of FIGS. 1 and 2 are manual valves. However a pneumatic means or an electric motor may be used to axially move the stem 4. Structurally, such "power" valves have practically nothing different from the valves shown.

If such a valve is intended to be used at high temperatures, its valve body 1 is made from an austenitic stainless steel, and a heating jacket 17 is provided around the valve body 1.

To use such a valve at high temperatures, the valve has to be first heated to a predetermined temperature.

The austenitic stainless steel, from which the valve body 1 is made, has a high thermal expansion coefficient. 6 When the valve is heated in a closed state, the valve body 1 and the stem 4 are heated to higher temperatures than the yoke 9. The stem 4 is thus thermally expanded to a greater degree than the valve body 1 and the yoke 9 combined. If the valve were closed when heated, the seat 3 might be destroyed, and/or the stem 4 might be bent due to excessive compressive stress acting on the stem 4.

Thus, in order to prevent excessive stress acting on the stem, the valve has to be kept slightly open while the valve is being heated.

The valve body 1 is made from an austenitic stainless steel to improve corrosion resistance. Thus, if the valve body 1 is made from an austenitic stainless steel, it is an ordinary practice to also make other parts that are brought into contact with fluid, such as the stem 4, from an austenitic stainless steel. The yoke 9, which is kept out of contact with fluid, is usually made from inexpensive carbon steel.

For a valve of this type, the compressive stress that acts on the stem 4 when the valve is heated to 300° C. with the valve closed.

In our experiment, when the valve body 1 was heated to 300° C., the temperature of the stem 4 and the yoke 9 at their exposed portions were 80° C. and 50° C., respectively.

If this valve is closed at 20° C. and heated to 300° C., then the valve body temperature changes 280° C. (=300−20). The stem temperature, which is herein assumed to be the average of temperatures at its hottest and coldest portions, changes 170° C.=(300+80)/2−20. The yoke temperature changes 30° C. (=50−20).

Supposing that the length from the seat 3 of the valve body 1 to the yoke 9 mounting portion is L, the length of the yoke 9 was 1.5 L and the length from the seat 3 of the stem 4 to the driving screw portion was 2.5 L.

The thermal expansion amounts at the respective parts are calculated below:

Stem 4:

$$170 \times 1.7 \times 10^{-5} \times 2.5L = 7.225 \times 10^{-3} L$$

Valve body 1 and yoke 9 combined:

$$280 \times 1.7 \times 10^{-5} \times L + 30 \times 1.1 \times 10^{-5} \times 1.5L = 5.255 \times 10^{-3} \times L$$

wherein $1.7 \times 10^{-5}/°$ C. and $1.1 \times 10^{-5}/°$ C. are thermal expansion coefficients of an austenitic stainless steel and a carbon steel at their respective temperatures. From the above equations, it is apparent that the stem 4 will expand by $1.970 \times 10^{-3} \times L$ longer than the combined elongation of the valve body 1 and yoke 9. Since the modulus of longitudinal elasticity of an austenitic stainless steel is about 21000 kg/mm², the compressive stress that acts on the stem 4 at this time will be:

$$\sigma = 21,000 \times 1.970 \times 10^{-3} = 41.4 \text{ kg/mm}^2$$

At 200–300° C., the allowable stress for an austenitic stainless steel is about 10 kg/mm² at the most. Thus, it is apparent that the stem cannot withstand such a large stress.

Since the seat 3 and the stem head 16 are tapered, the stem head will cut into the seat if the difference in thermal expansions of the respective parts is large as above. Thus, this results in the seat 3 being destroyed, and/or the stem 4 being bent under excessive compressive stress. In either case, the valve fails. Thus, when such a valve is heated, it is essential to keep the valve slightly open.

An object of the present invention is to provide an austenitic stainless steel valve which is easy to operate at the beginning of use.

SUMMARY OF THE INVENTION

According to this invention, there is provided an austenitic stainless steel valve comprising a stem adapted to be reciprocated to open and close the valve, and a valve body made from an austenitic stainless steel, the stem being made from a metal having a thermal expansion coefficient that is ten-thirteenths or less of the thermal expansion coefficient of an austenitic stainless steel.

The stem may be made from one of ferritic and martensitic stainless steels. The valve may be further provided with a jacket for heating the valve body.

Other features and objects of the present invention will become apparent from the following description made with reference to the accompanying drawings.

DETAILED DESCRIPTION OF THE PREFERRED EMBODIMENT

An embodiment of this invention is now described with reference to the drawings.

Figure 1:
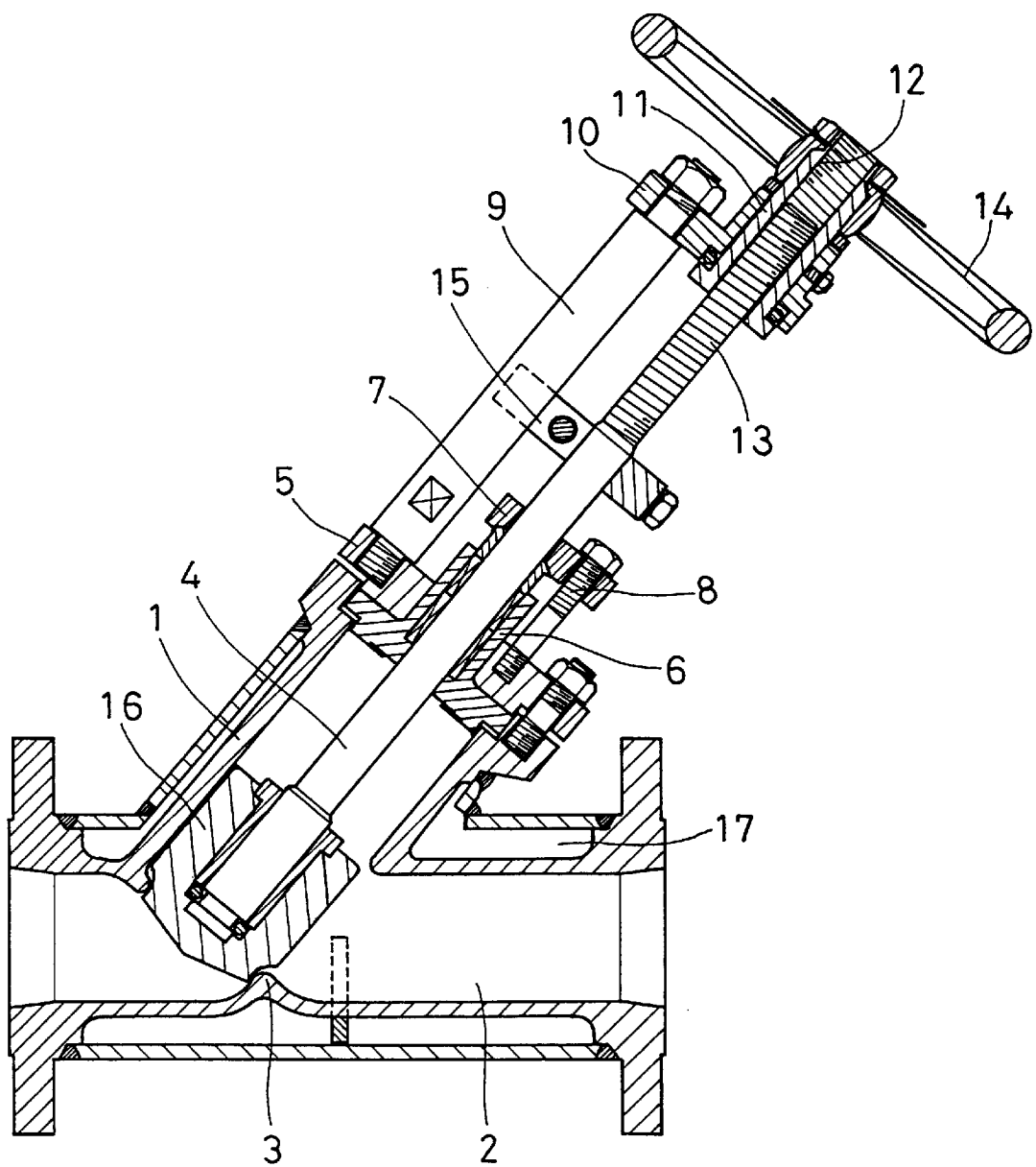
FIGS. 1 and 2 are sectional views of a Y type globe valve.
Figure 2:
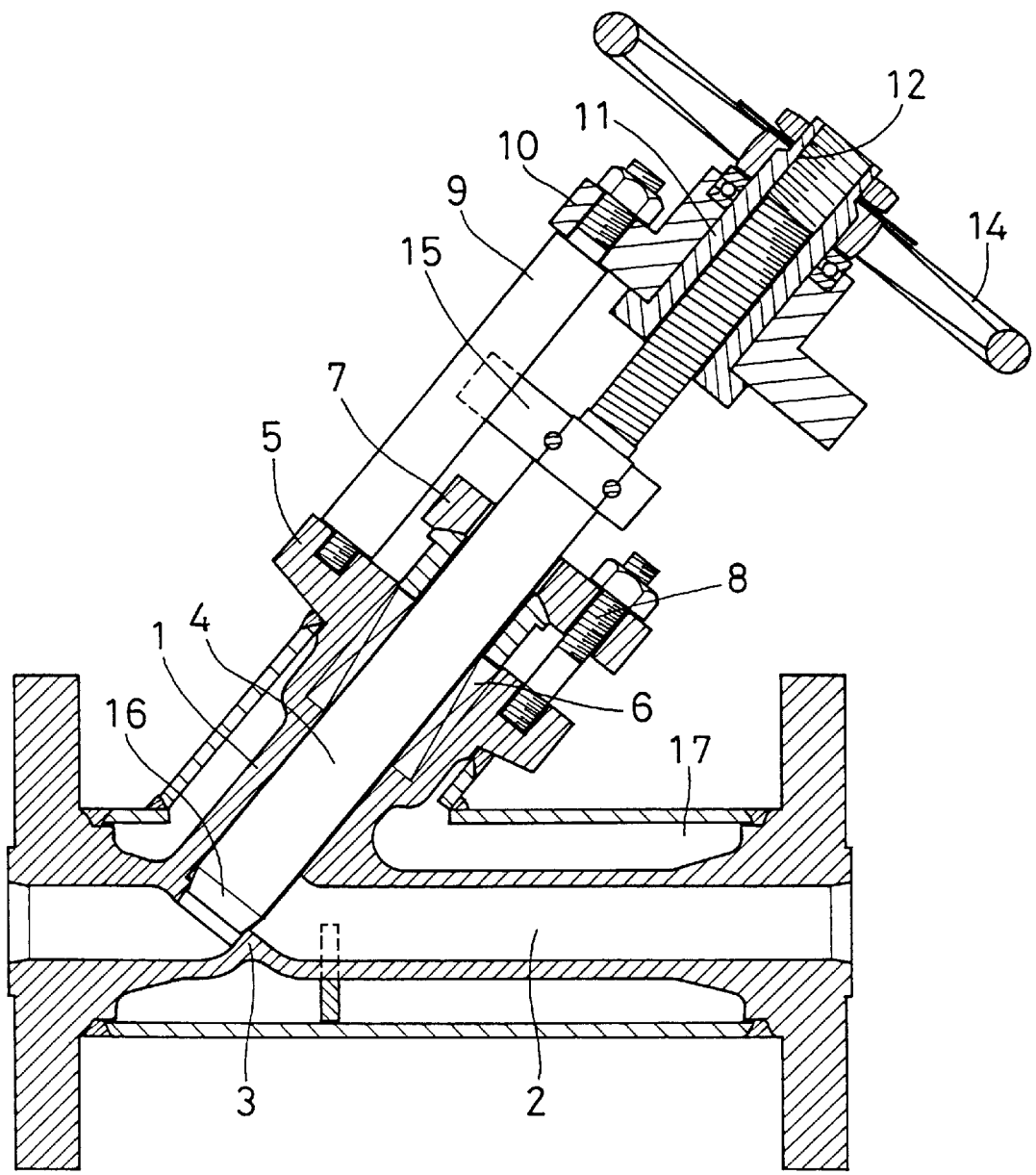

Structurally, valves according to this invention are exactly the same as those shown in FIGS. 1 and 2. While their valve bodies 1 are made from an austenitic stainless steel, the stem 4 is made from a metal having a thermal expansion coefficient that is ten-thirteenths or less of that of an austenitic stainless steel. Such metals include ferritic stainless steels and martensitic stainless steels.

Fortunately, austenitic, ferritic and martensitic stainless steels have different alloy compositions and thus different thermal expansion coefficients. That is, as mentioned earlier, austenitic stainless steels have a thermal expansion coefficient of $1.7 \times 10^{-5}/°$ C., while ferritic and martensitic stainless steel have a thermal expansion coefficient near that of carbon steel (i.e., $1.1 \times 10^{-5}/°$ C.). For a valve having a valve body 1 made from an austenitic stainless steel, and a stem 4 made from a ferritic or martensitic stainless steel instead of an austenitic stainless steel, the thermal expansion coefficients of the stem 4 and the valve body 1+yoke 9 are calculated as follows:

stem 4:

$$170 \times 1.1 \times 10^{-5} \times 2.5L = 4.675 \times 10^{-3} \times L$$

valve body 1+yoke 9:

$$280 \times 1.7 \times 10^{-5} \times L + 30 \times 1.1 \times 10^{-5} \times 1.5L = 5.255 \times 10^{-3} \times L$$

As shown, there is practically no difference between the thermal expansion of the stem 4 and the valve body 1 and yoke 9 combined, so that no excessive load is applied to the stem 4 when the valve is heated.

But ferritic and martensite stainless steels are inferior in corrosion resistance to austenitic stainless steels, and thus may not be able to be use according to the kind of fluid used. In such a case, instead of a ferritic or martensitic stainless steel, the stem 4 may be made from a corrosion-resistant, low-thermal-expansion stainless steel such as SUS630 or SUS329J1. Although the thermal expansion coefficients of these steels (i.e., $1.2 \times 10^{-5}/°$ C.) are slightly higher than that of ferritic and martensitic stainless steels, (i.e., $1.1 \times 10^{-5}/°$ C.) they are still sufficiently low. For a valve of this combination, the thermal expansions of the stem 4 and the valve body 1 and yoke 9 combined will be:

stem 4:

$$170 \times 1.2 \times 10^{-5} \times 2.5L = 5.100 \times 10^{-3} \times L$$

valve body 1 and yoke 9 combined:

$$280 \times 1.7 \times 10^{-5} \times L + 30 \times 1.1 \times 10^{-5} \times 1.5L = 5.255 \times 10^{-3} \times L$$

The stress on the stem 4 due to the difference between the thermal expansions would be:

$$\sigma = 21,000 \times (5.1000 - 5.255) \times 10^{-3} = 3.255 \text{ kg/mm}^2$$

Thus, as shown by the above equation, no compressive stress would exist on stem 4 as a result of the thermal expansions. This value is well within the allowable stress for these stainless steels.

The inventors found out that the object of this invention is achievable by making the stem 4 from a material having a thermal expansion coefficient that is ten-thirteenths or less of that of the material of the valve body 1.

Fortunately, besides the fact that these stainless steels have thermal expansion coefficients near to that of carbon steel than to an austenitic stainless steel, they have higher in allowable stresses than an austenitic stainless steel.

The valve body 1 is m ad e from an austenitic stainless steel, the yoke 9 is made from carbon steel, and the stem 4 is made from a ferritic or martensitic steel. If a corrosion resistance comparable to that of stainless steel 304 is required, the stem 4 may be made from stainless steel 630. If a corrosion resistance comparable to stainless steel 316 is required, the stem is made from stainless steel 329J. For higher safety, the yoke 9 may be made from an austenite stainless steel to further increase its thermal expansion.

Figure 3:
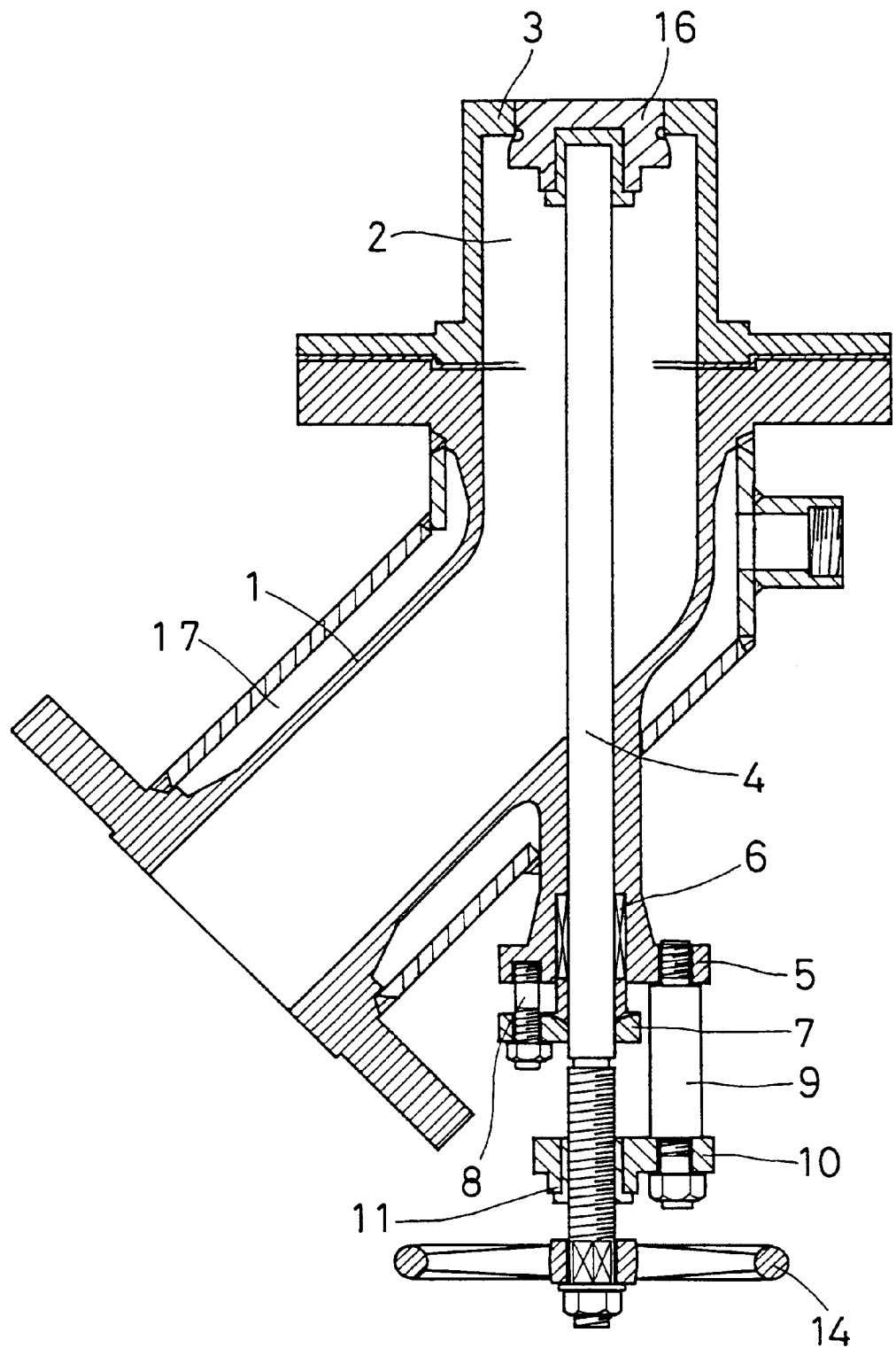
FIGS. 3 and 4 are sectional views of a flushing valve.
Figure 4:
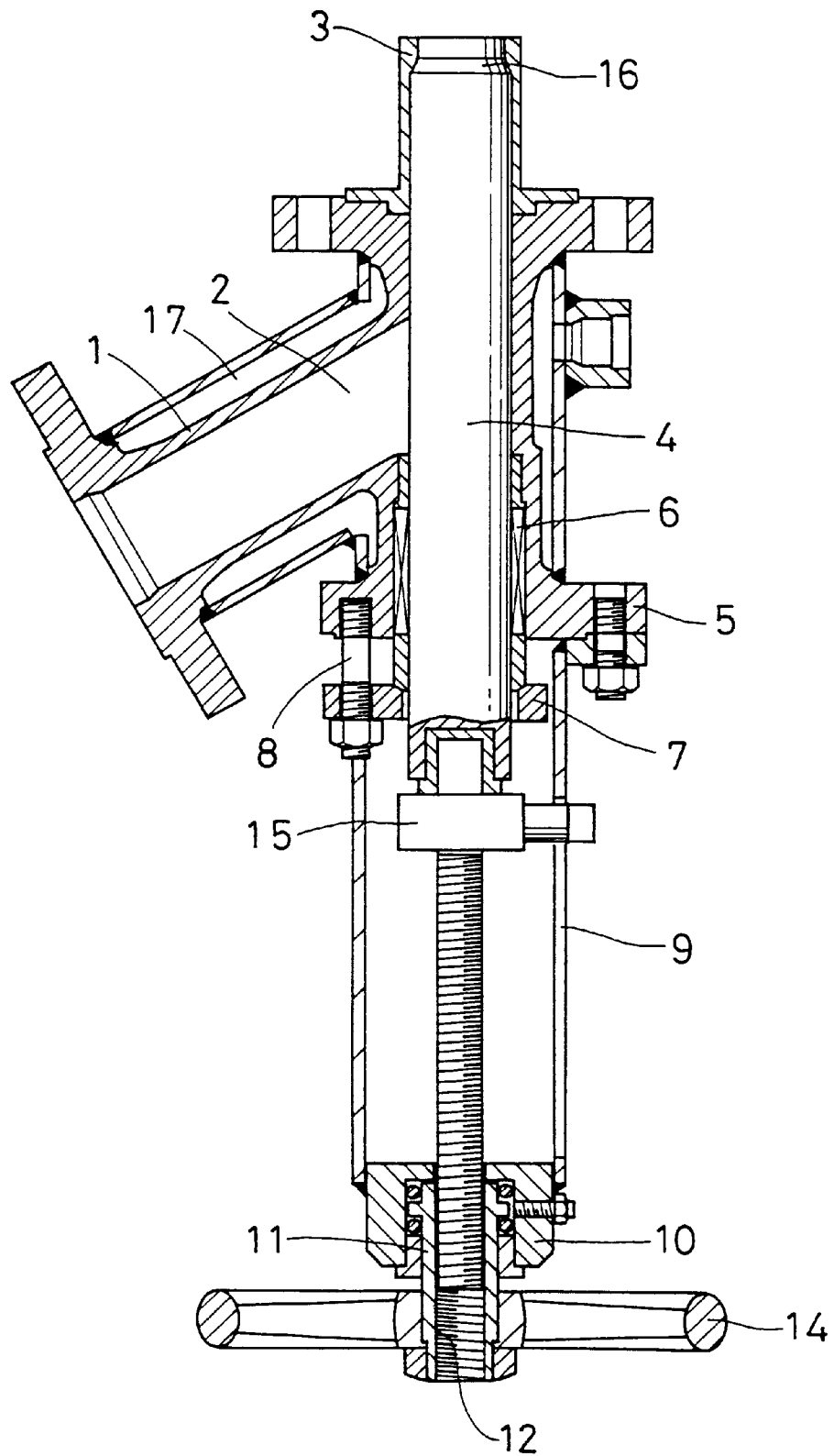
Figure 5:
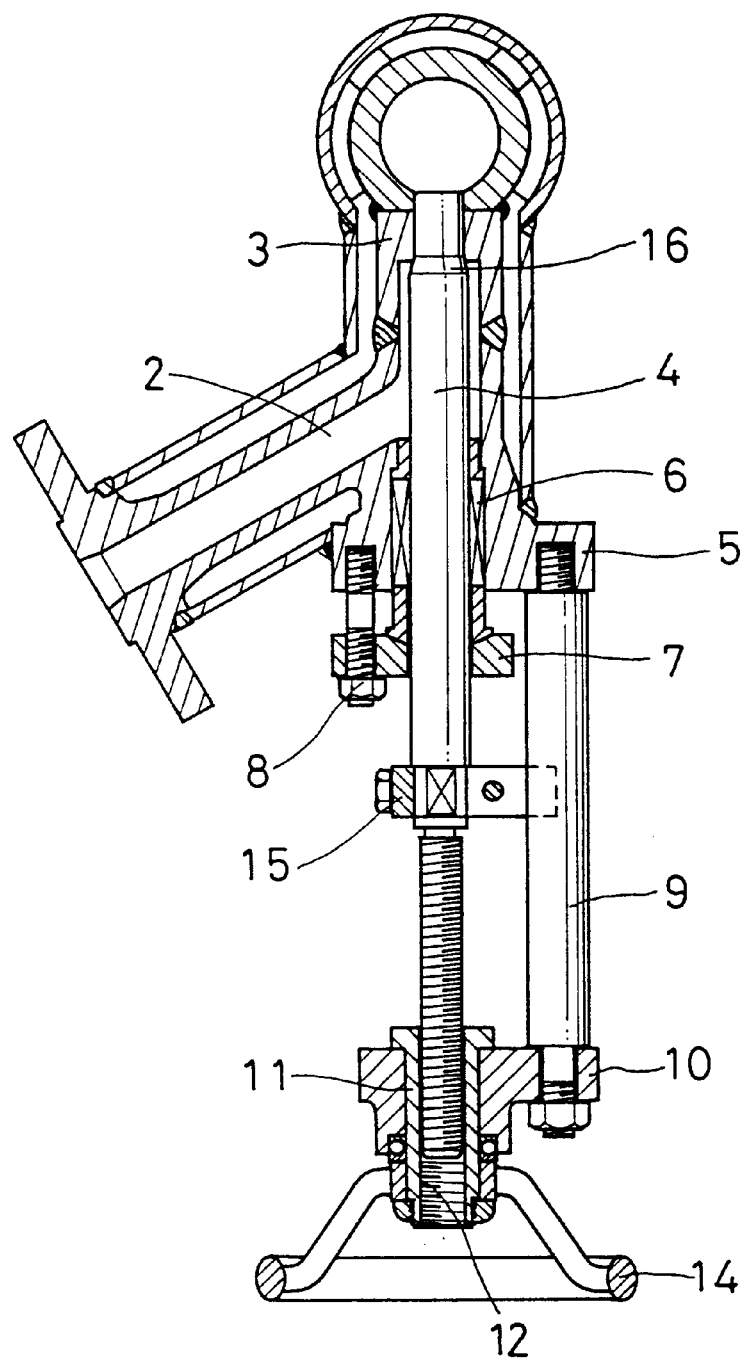
FIG. 5 is a sectional view of a sampling valve.
Figure 6:
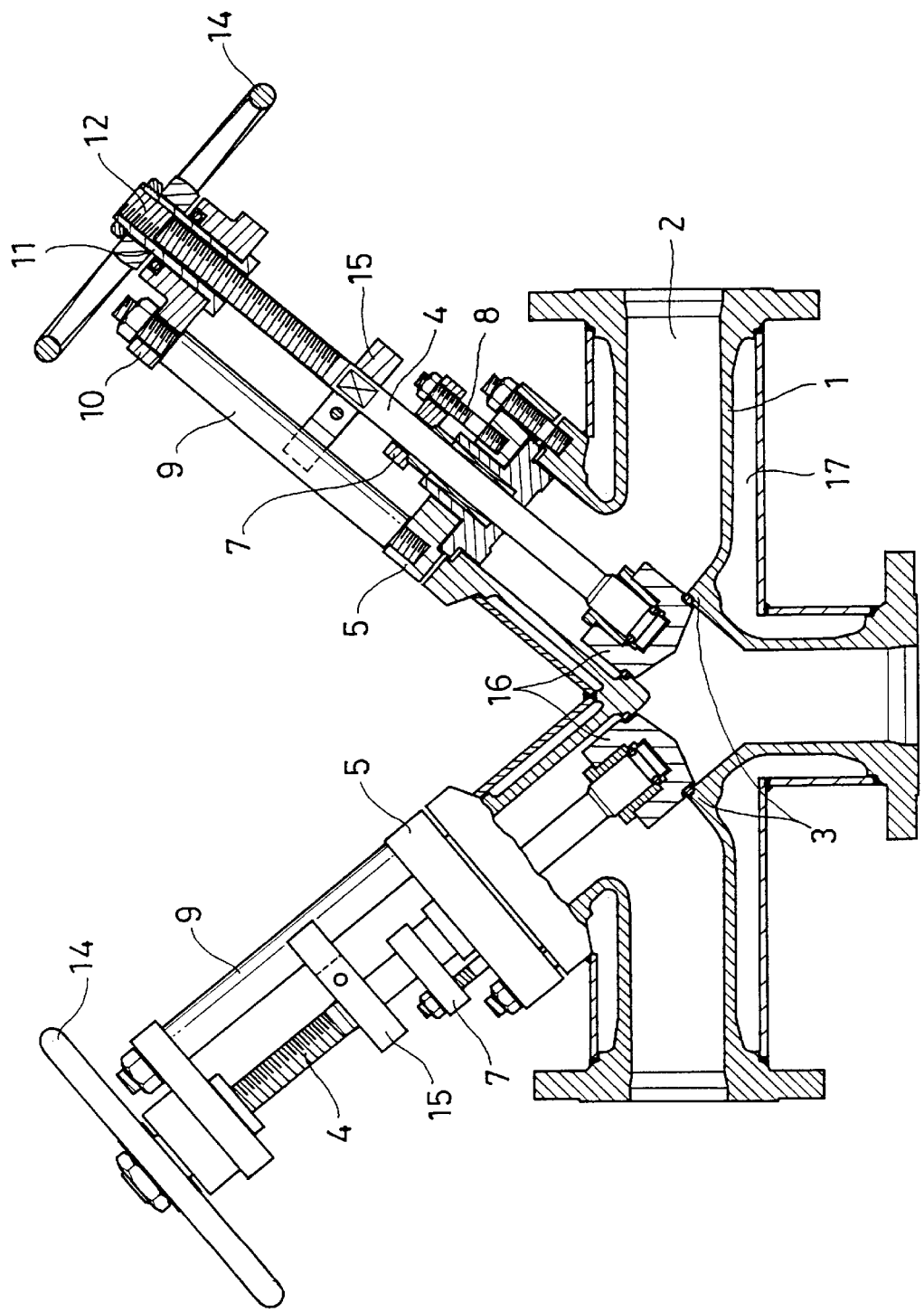
FIG. 6 is a sectional view of a three-way changeover valve.

The concept of this invention is also applicable to flushing valves shown in FIGS. 3 and 4, a sampling valve shown in FIG. 5, a three-way changeover valve shown in FIG. 6, and other valves such as gate valves, tank valves and pistons valves.

As described above, according to this invention, when the valve is heated for use at high temperatures, it is possible to restrict the compressive stress applied to the stem within the allowable stress of the material of the stem. Thus, it is possible to prevent the destruction of the seat 3 or the bending of the stem 4 even without slightly opening the valve when it is heated. The valve can thus be operated easily.

What is claimed is:

1. A valve comprising:
   a valve body made of an austenitic stainless steel;
   a stem provided in said valve body, said stem being axially movable in said valve body, and said stem having a first end and a second end;
   a disk provided on said first end of said stem;
   a valve seat provided in said valve body and arranged opposite said disk;
   a yoke having a first end and a second end, said first end of said yoke being connected to said valve body, said second end of said yoke engaging said second end of said stem so that said stem is axially movable toward and away from said valve seat; and
   said stem being made from a metal having a thermal expansion coefficient that is ten-thirteenths or less of a thermal expansion coefficient of said austenitic stainless steel.

2. A valve as claimed in claim 1, wherein said stem is made from one of a ferritic stainless steel and a martensitic stainless steel.

3. A valve as claimed in claim 2, further comprising a heating jacket provided around said valve body to heat said valve body.

4. A valve as claimed in claim 1, further comprising a heating jacket provided around said valve body to heat said valve body.

5. A valve as claimed in claim 1, wherein said disk is a separate component from said stem and said disk is mounted on said first end of said stem.

6. A valve as claimed in claim 1, wherein said disk is integrally formed on said first end of said stem.

7. A valve as claimed in claim 1, wherein said stem is made from one of a SUS630 stainless steel and a SUS329J1 stainless steel.

8. A valve as claimed in claim 7, further comprising a heating jacket provided around said valve body to heat said valve body.

9. A valve as claimed in claim 1, wherein said second end of said yoke threadedly engages said second end of said stem.

* * * * *